United States Patent
Peck et al.

(10) Patent No.: US 10,737,209 B2
(45) Date of Patent: Aug. 11, 2020

(54) METHODS AND APPARATUSES FOR MISSING FILTER DETECTION AND PREVENTION IN ROTATING COALESCER DESIGNS

(71) Applicant: Cummins Filtration IP, Inc., Columbus, IN (US)

(72) Inventors: Lee A. Peck, Stoughton, WI (US); Vincil A. Varghese, Stoughton, WI (US); Arun P. Janakiraman, Stoughton, WI (US); James Bass, Janesville, WI (US); Suryanaryanan Paneerselvam, Chennai (IN); Peter K. Herman, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 113 days.

(21) Appl. No.: 15/577,539

(22) PCT Filed: Jun. 1, 2016

(86) PCT No.: PCT/US2016/035209
§ 371 (c)(1),
(2) Date: Nov. 28, 2017

(87) PCT Pub. No.: WO2016/196588
PCT Pub. Date: Dec. 8, 2016

(65) Prior Publication Data
US 2018/0140985 A1 May 24, 2018

Related U.S. Application Data

(60) Provisional application No. 62/169,927, filed on Jun. 2, 2015.

(51) Int. Cl.
*B01D 46/00* (2006.01)
*F01M 13/04* (2006.01)
(Continued)

(52) U.S. Cl.
CPC ......... *B01D 46/003* (2013.01); *B01D 46/009* (2013.01); *B01D 46/0056* (2013.01);
(Continued)

(58) Field of Classification Search
CPC .. B01D 46/00; B01D 46/003; B01D 46/0056; B01D 46/009; B01D 46/2403;
(Continued)

(56) References Cited

U.S. PATENT DOCUMENTS

| 5,846,417 A | 12/1998 | Jiang et al. |
| 2006/0086652 A1 | 4/2006 | Knight |

(Continued)

OTHER PUBLICATIONS

International Search Report and Written Opinion issued for PCT/US2016/035209, dated Aug. 25, 2016, 16 pages.

*Primary Examiner* — T. Bennett McKenzie
(74) *Attorney, Agent, or Firm* — Foley & Lardner LLP

(57) ABSTRACT

Systems and methods for detecting a missing coalescing element in a CV system are described. In some arrangements, the described systems and methods prevent the assembly and/or re-assembly of the CV system without an appropriate coalescing element positioned within the CV system housing (e.g., during a coalescing element service operation). In some arrangements, the coalescing element depresses a spring-loaded component of a shaft that provides flow of bypass gases to the CV system. If the spring-loaded component is not depressed, significant restriction is introduced to the CV system, and an on-board-diagnostic system may detect high-crankcase pressure through existing crankcase pressure sensors and de-rate the internal combustion engine. In other arrangements, a spring-loaded mechanism within the shaft prevents a housing cover (e.g., a lid to the housing of the CV system) from being repositioned when a coalescing element is not installed within the housing.

5 Claims, 11 Drawing Sheets

(51) Int. Cl.
- B01D 46/24 (2006.01)
- B01D 46/26 (2006.01)
- F01M 13/00 (2006.01)
- B01D 46/42 (2006.01)

(52) U.S. Cl.
CPC ......... B01D 46/2403 (2013.01); B01D 46/26 (2013.01); F01M 13/0011 (2013.01); F01M 13/04 (2013.01); B01D 46/4272 (2013.01); B01D 2201/0461 (2013.01); B01D 2201/29 (2013.01); B01D 2201/30 (2013.01); B01D 2201/4046 (2013.01); F01M 2013/0016 (2013.01); F01M 2013/0044 (2013.01); F01M 2013/0422 (2013.01); F01M 2013/0438 (2013.01)

(58) Field of Classification Search
CPC ................ B01D 46/26; B01D 46/4272; B01D 2201/29; B01D 2201/30–316; B01D 2201/4046–4061; F01M 13/0011; F01M 13/04; F01M 2013/0016; F01M 2013/0044; F01M 2013/0422; F01M 2013/0438

USPC ............ 55/400–409, 490–519; 210/232–238

See application file for complete search history.

(56) References Cited

U.S. PATENT DOCUMENTS

| | | |
|---|---|---|
| 2009/0090668 A1 | 4/2009 | Abdalla et al. |
| 2009/0114588 A1 | 5/2009 | Bagci et al. |
| 2011/0113737 A1* | 5/2011 | Scheckel ............. B01D 46/003 55/313 |
| 2013/0056407 A1 | 3/2013 | Parikh et al. |
| 2013/0228503 A1* | 9/2013 | Baumann ............. B01D 35/147 210/232 |
| 2014/0208702 A1 | 7/2014 | Lundgren et al. |
| 2014/0353233 A1 | 12/2014 | Dhiman |

* cited by examiner

METHODS AND APPARATUSES FOR MISSING FILTER DETECTION AND PREVENTION IN ROTATING COALESCER DESIGNS

CROSS-REFERENCE TO RELATED APPLICATIONS

The present application is a National Phase of PCT Application No. PCT/US2016/035209, filed Jun. 1, 2016, which claims benefit of priority to U.S. Provisional Application No. 62/169,927, filed Jun. 2, 2015. The contents of both applications are incorporated herein by reference in their entirety.

TECHNICAL FIELD

The present application relates to crankcase ventilation ("CV") systems. More particularly, the present application relates to detecting or preventing missing CV service element situations in CV systems.

BACKGROUND

During operation of an internal combustion engine, a fraction of combustion gases can flow out of the combustion cylinder and into the crankcase of the engine. These gases are often called "blowby" gases. Typically, the blowby gases are routed out of the crankcase via a CV system. The CV system may pass the blowby gases through a coalescer (i.e., a coalescing filter element) to remove a majority of the aerosols and oils contained in the blowby gases. The coalescer may be a rotating coalescer or a stationary coalescer. The filtered blowby gases are then either vented to the ambient (in open CV systems) or routed back to the air intake for the internal combustion engine for further combustion (in closed CV systems).

In rotating coalescer and non-rotating coalescer CV systems, there is a need to detect a missing filter element. If the CV system is an emissions controlling device, as is the case in open CV systems, then there may be a jurisdictional requirement to detect if the installed (or missing) coalescer does not meet emissions standards. For closed CV systems, such detection and prevention systems are typically deployed at the requests of customers to detect a missing or improper element.

In some rotating coalescer arrangements, these detection and prevention needs are met with the inclusion of a revolution per minute ("RPM") sensor that communicates with the internal combustion engine's engine control module ("ECM"). However, not all ECMs include an available input/output port that can accept input from an RPM sensor. Further, RPM sensors can be relatively expensive components.

In some static coalescer arrangements, detection and prevention needs are met by using the existing crankcase pressure connectors. Static coalescers typically have a large pressure drop across the media of the static coalescer. Accordingly, it is possible to detect a missing filter by comparing actual pressure drop values with expected pressure drop values across the CV system as well as comparing differences of crankcase pressure based on the engine duty cycle. However, this form of detection is not possible or is very difficult for rotating coalescers, because most rotating coalescer arrangements have minimal associated pressure drop (e.g., close to zero inches of water) across the element. Accordingly, a missing element situation may not be detected by a crankcase pressure sensor.

SUMMARY

A first example embodiment relates to a CV system. The CV system includes a housing configured to removably receive a coalescing element. The CV system further includes a central shaft having a fixed portion, a movable portion. The fixed portion includes an inlet that receives a flow of blowby gases and a first circumferential slot. The movable portion includes a second circumferential slot. The spring biases the movable portion away from the fixed portion such that when the coalescing element is removed from the housing, the spring biases the movable portion to an uncompressed state in which the first circumferential slot and the second circumferential slot do not align thereby blocking the flow of blowby gases through the system. When the coalescing element is installed in the housing, the coalescing element forces the movable portion into a compressed state in which the first circumferential slot and the second circumferential slot align thereby allowing blowby gases to pass through the system.

Another example embodiment relates to a CV system. The CV system includes a housing having a housing base and a housing cover. The housing cover is removably attachable to the housing base. The housing is configured to receive a coalescing element. The CV system further includes a central shaft and a spring-loaded no-filter no-assembly feature that prevents the housing cover from beings secured to the housing base when the coalescing element is not installed within the housing. The spring-loaded no-filter no-assembly feature is positioned within the central shaft.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF THE VARIOUS EMBODIMENTS

Referring to the figures generally, systems and methods for detecting a missing coalescing element in a CV system. In some arrangements, the described systems and methods prevent the assembly and/or re-assembly of the CV system without an appropriate coalescing element positioned within the CV system housing (e.g., during a coalescing element service operation). In some arrangements, the coalescing element depresses a spring-loaded component of a shaft that provides flow of blowby gases to the CV system. If the spring-loaded component is not depressed, significant restriction is introduced to the CV system, and an on-board-diagnostic ("OBD") system may detect high-crankcase pressure through existing crankcase pressure sensors and de-rate the internal combustion engine. In other arrangements, a spring-loaded mechanism within the shaft prevents a housing cover (e.g., a lid to the housing of the CV system) from being repositioned when a coalescing element is not installed within the housing.

Figure 1:
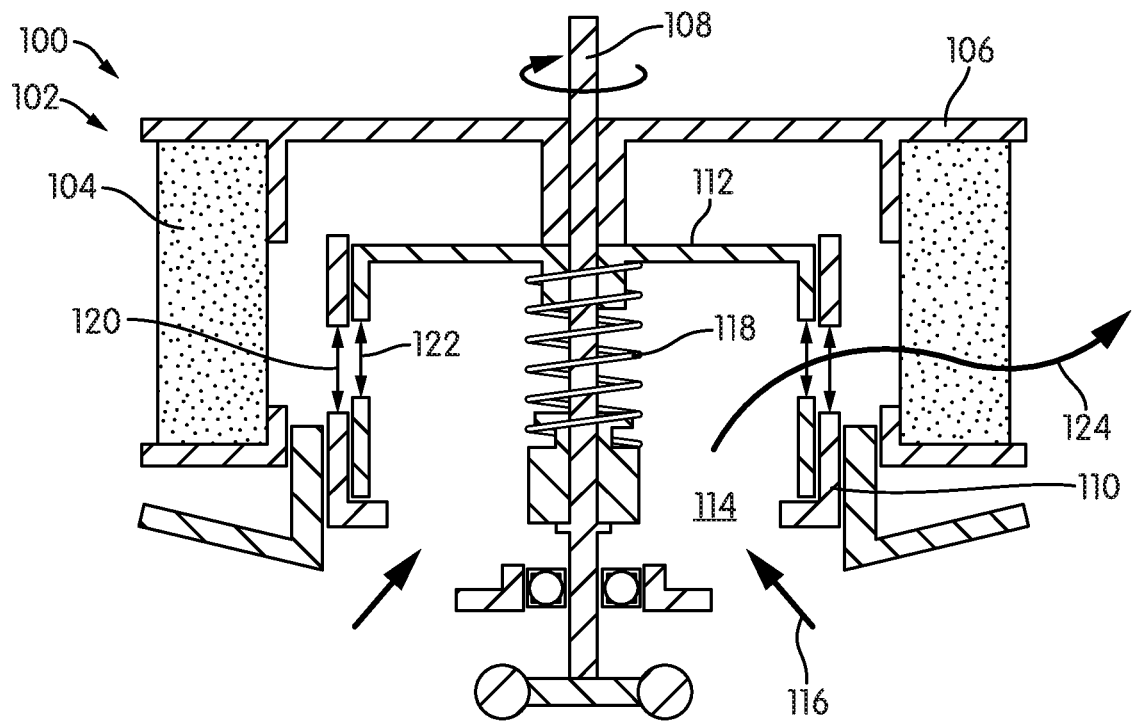
FIG. 1 shows a cross-sectional view of a CV system according to an example embodiment.

Referring to FIG. 1, a cross-sectional view of a CV system 100 is shown according to an example embodiment. The CV system 100 is a rotating coalescing CV system for an internal combustion engine that processes blowby gases (i.e., removes aerosols and oils from the blowby gases) from the internal combustion engine. In some arrangements, the CV system 100 is an open CV system that provides the filtered blowby gases to the ambient environment. In other arrangements, the CV system 100 is a closed CV system that provides the filtered blowby gases to the air intake of the internal combustion engine for further combustion.

Figure 2:
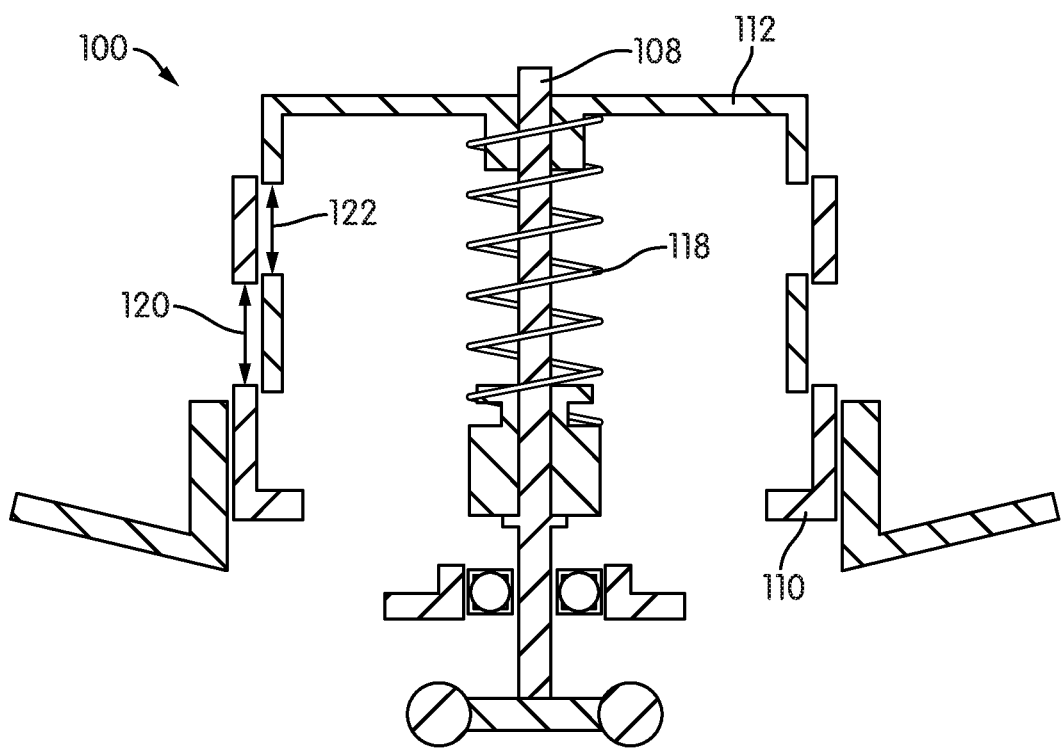
FIG. 2 shows a cross-sectional view of the CV system of FIG. 1, with a coalescing element removed or uninstalled from the CV system.

The CV system 100 includes a rotating coalescing element 102. The rotating coalescing element 102 includes coalescing media 104 and a frame 106. As shown in FIG. 1, the coalescing element 102 is removably secured to a central shaft 108 via the frame 106 such that the coalescing element 102 can be removed during service operations (e.g., as shown in FIG. 2). The coalescing element 102 is a rotating coalescing element. Accordingly, the coalescing element 102 rotates when the central shaft 108 rotates. The central shaft 108 includes an axially-fixed portion 110 and a movable portion 112. The fixed portion 110 includes an inlet 114 that receives a flow 116 of blowby gases from a crankcase of the internal combustion engine. The fixed portion 110 is axially fixed along the central shaft 108. The movable portion 112 slides axially along the central shaft 108. The movable portion 112 is biased away from the fixed portion 110 by a spring 118. The spring 118 is attached at a first end to the movable portion 112 and at a second end to the fixed portion 110.

The fixed portion 110 includes a first circumferential slot 120, and the movable portion 112 includes a second circumferential slot 122. When the rotating coalescing element 102 is installed in the CV system 100, the frame of 106 presses against the movable portion 112 and compresses the spring 118 until the filter is received in the CV system 100 in an installed position (e.g., as shown in FIG. 1). In this arrangement, the movable portion 112 is in a compressed state. In the compressed state, the first circumferential slot 120 of the fixed portion 110 and the second circumferential slot 122 of the movable portion 112 align such that blowby gas can pass through the aligned slots 120 and 122 and through the coalescing media 104 along the flow path 124. Accordingly, when an authorized coalescing element, such as coalescing element 102, is installed in the CV system 100, the CV system 100 functions normally.

Referring to FIG. 2, a cross-sectional view of the CV system 100 is shown with the coalescing element 102 removed or uninstalled from the CV system 100. As shown in FIG. 2, the spring 118 biases the movable portion 112 away from the fixed portion 110. The movable portion 112 is biased into the uncompressed state. While in the uncompressed state, the first circumferential slot 120 and the second circumferential slot 122 do not align. This occurs as a result of the spring 118 biasing the movable portion 112 away from the fixed portion 110 in order to create the misalignment. Because the first circumferential slot 120 and the second circumferential slot 122 do not align, flow path 124 is blocked, thereby restricting the flow of blowby gases through the CV system 100. During internal combustion engine operation, when the coalescing element 102 is removed or uninstalled from the CV system 100, the pressure within the crankcase increases because the blowby gases do not vent properly through the CV system 100. A pressure sensor within the crankcase sends a feedback signal to the ECU indicating a pressure spike within the crankcase, which causes the ECU to indicate an error via the OBD system of the internal combustion engine. In response to the error caused by the increase pressure within the crankcase, the ECU can de-rate the internal combustion engine to reduce the likelihood of damage to the internal combustion engine caused by the increased pressure within the crankcase.

Figure 3:
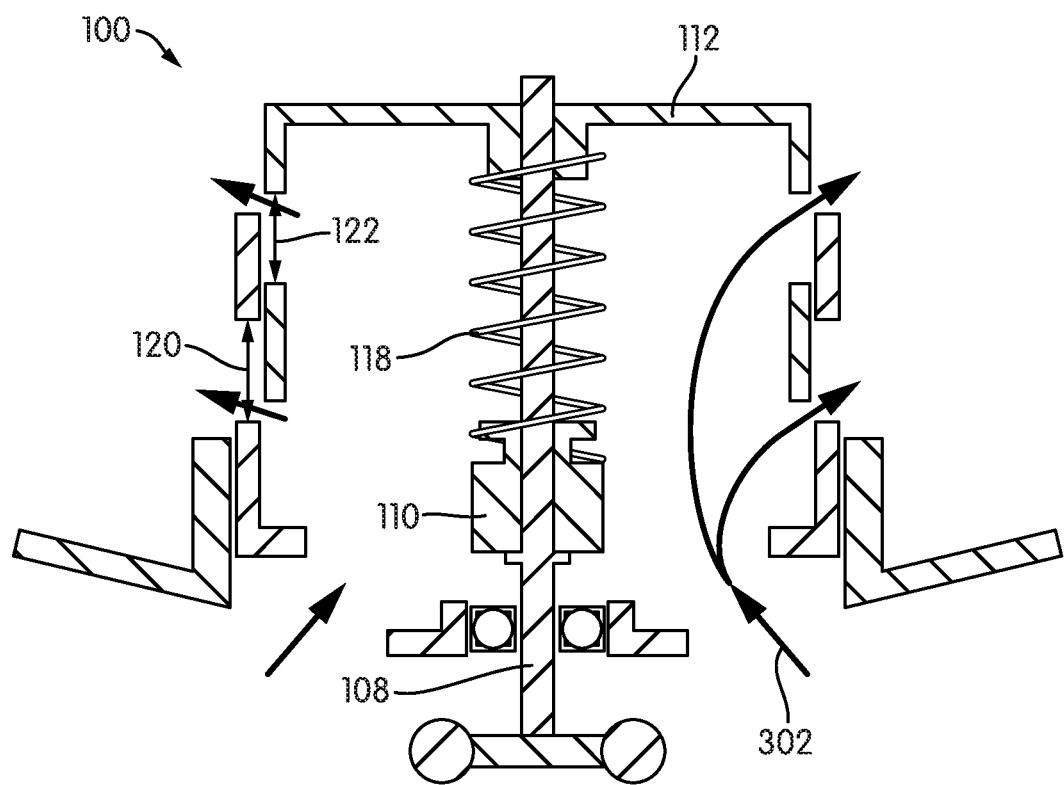
FIG. 3 shows a cross-sectional view of the CV system of FIG. 1, with the coalescing element removed or uninstalled from the CV system after pressure has built up within the crankcase of the internal combustion engine.

Referring to FIG. 3, a cross-sectional view of the CV system 100 is shown with the coalescing element 102 removed or uninstalled from the CV system 100 after pressure has built up within the crankcase of the internal combustion engine. As shown in FIG. 3, the spike in pressure within the crankcase causes the blowby gas to push the movable portion 112 axially away from the fixed portion 110 along the central shaft 108 until the movable portion 112 reaches a hard stop to a bypass position. When the movable portion 112 is in the bypass position, the spring 118 is stretched past the resting or equilibrium position of the spring 118. The hard stop may be caused by the movable portion 112 contacting a top of a housing of the CV system 100. The position of the movable portion 112 corresponds to the CV system 100 being in a bypass mode. While in the bypass mode, the first circumferential slot 120 and the second circumferential slot 122 partially overlap. The partial overlap of the first circumferential slot 120 and the second circumferential slot 122 permits blowby gas can flow through the CV system 100 along flow path 302. The flow of the blowby gas along flow path 302 is more restricted than the flow of the blowby gas along path 124 (e.g., as shown in FIG. 1). Accordingly, the pressure sensor within the crankcase may send a feedback signal to the ECU indicating a high crankcase pressure, which causes the ECU to indicate an error via the OBD system of the internal combustion engine in a similar manner as discussed above with respect to FIG. 2. In response to the error caused by the increase pressure within the crankcase, the ECU can de-rate the internal combustion engine to reduce the likelihood of damage to the internal combustion engine caused by the increased pressure within the crankcase.

Although the CV system 100 is described as a rotating coalescing CV system, the same principles may be applied to a stationary coalescing CV system. In such an arrangement, the central shaft 108 does not rotate, and the coalescing element 102 remains stationary within the CV system housing. Blowby gases are still be routed through the central shaft 108 in the same manner as described above. Depending on whether a stationary coalescer element is positioned, the blowby gases flow substantially freely through the central shaft 108 (e.g., as shown in FIG. 1), be blocked (e.g., as shown in FIG. 2), or be substantially restricted (e.g., as shown in FIG. 3). Accordingly, the stationary coalescing CV system functions in the same manner as described above.

Figure 4:
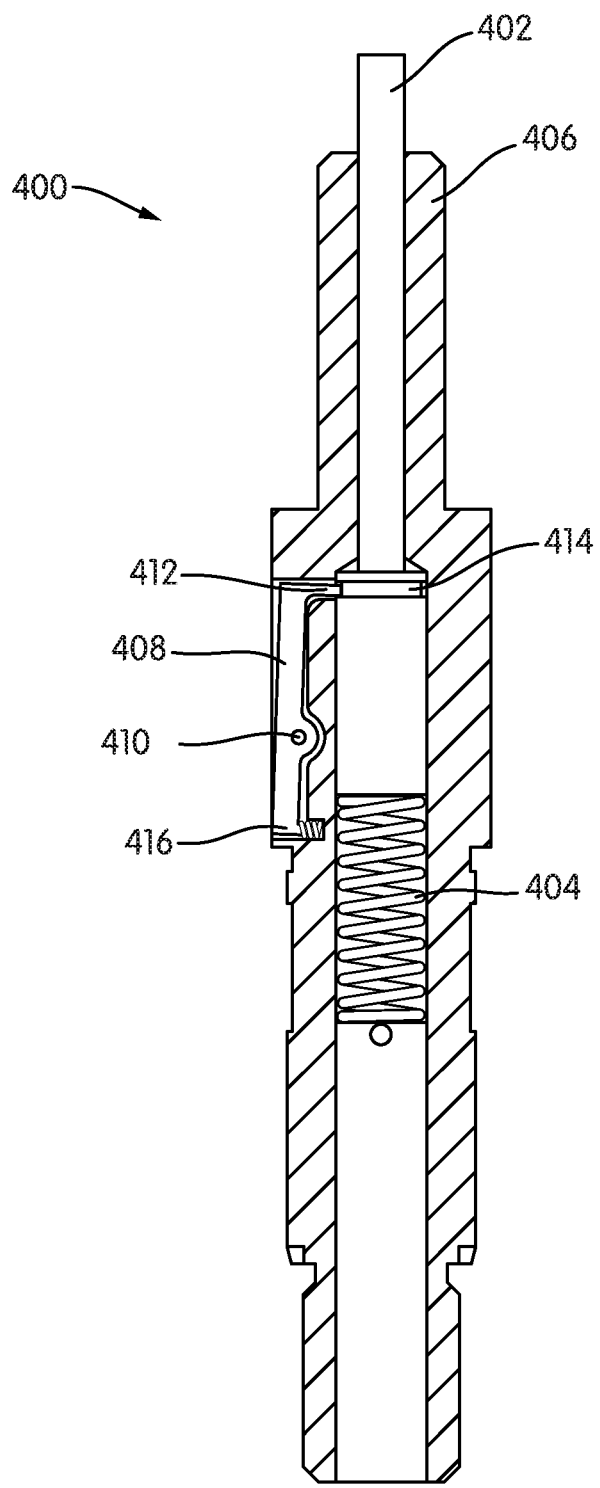
FIG. 4 shows a central shaft of a CV system according to an example embodiment.

Referring to FIG. 4, a central shaft 400 of a CV system is shown according to an example embodiment. The central shaft 400 is positioned in a CV system in a similar manner as discussed above with the central shaft 108 of the CV system 100. The central shaft 400 may be installed in a CV system that utilizes a rotating coalescing element or a stationary coalescing element. In arrangements where the central shaft 400 is installed in a CV system that utilizes a rotating coalescer, the central shaft 400 provides rotational motion to the rotating coalescer. The central shaft 400, when installed in a CV system, is configured to receive a coalescing filter element. The central shaft 400 includes a spring-loaded pin 402. The pin 402 is biased in an axially outward direction with respect to the shaft 400 by a spring 404. An outer portion 406 of the shaft 400 circumferentially surrounds the pin 402.

The central shaft 400 includes a locking lever 408. The locking lever 408 pivots in a radial direction with respect to the central shaft 400 about a pivot pin 410. The locking lever 408 includes a locking projection 412. The locking projection 412 is received in a groove 414 in the pin 402 when the pin 402 is in an extended position (e.g., as shown in FIG. 4). When the locking projection 412 is received in the in the groove 414, the pin 402 cannot be pushed into the outer portion 406 of the shaft 400. When the locking lever 408 is pivoted about the pin 410, the locking projection 412 lifts out of the groove 414, and the pin 402 can be pushed into the outer portion 406 of the shaft 400. A lifting portion 416 of the locking lever 408 is exposed outside of the outer portion 406. When the lifting portion 416 is pressed inwards towards the central axis of the central shaft 400, the locking projection 412 lifts out of the groove 414 and the pin 402 can be pushed into the outer portion 406 of the shaft 400 (i.e., into a retracted position).

During operation, the spring-loaded pin 402 functions as a missing filter prevention device. When no coalescing element is installed in the CV system, the spring 404 biases the pin 402 to the extended position such that the pin 402 extends outside of the outer portion 406 of the shaft 400. The locking lever 408 locks the pin 402 in the extended position. Accordingly, the pin 402 cannot be pushed back into the outer portion 406 of the shaft 400. When the pin 402 is in the extended position, the pin 402 prevents a cover of the housing of the CV system from closing (e.g., from being bolted onto a base of the CV system). Accordingly, the CV system cannot function without a coalescing element positioned within the housing. When a coalescing element is installed in the CV system, the frame of the coalescing element presses the lifting portion 416 of the locking lever 408, which removes the locking projection 412 from the groove 414. Accordingly, when the coalescing element is installed, the pin 402 can be pushed into the outer portion 406 of the shaft 400 and into the retracted position, and the cover of the housing can be properly closed.

Figure 5:
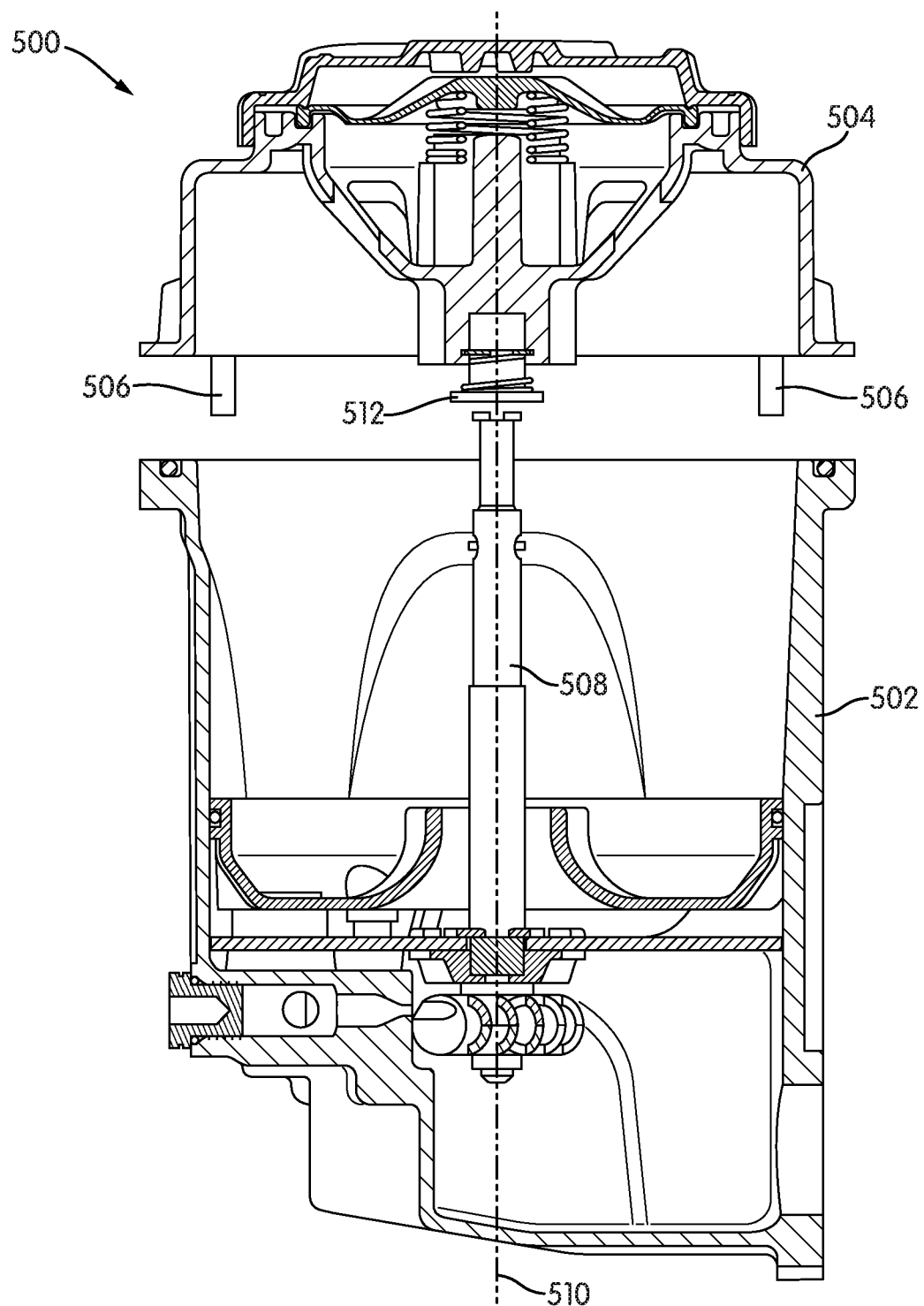
FIG. 5 shows a cross-sectional view of a CV system according to an example embodiment.

Referring to FIG. 5, a cross-sectional view of a CV system 500 is shown according to an example embodiment. The CV system 500 includes a housing base 502 and a housing cover 504. The housing cover 504 is removably secured to the housing base through thread bolts 506. The housing base 502 and the housing cover 504 form the housing of the CV system 500. As shown in FIG. 5, no coalescing element is installed in the housing. The CV system 500 includes a central shaft 508. The central shaft 508 extends axially along a central axis 510 of the housing. During operation, when a coalescing element is installed in the housing, the central shaft 508 is rotated (e.g., via an oil jet and pelton wheel, via a gear drive system, via a chain drive system, via a direct motor drive system, etc.), which rotates the installed coalescing element. A top portion of the central shaft 508 is received in a bushing 512 of the housing cover 504. As described in further detail below, the central shaft 508 includes a no-filter no-assembly feature.

Figure 6A:
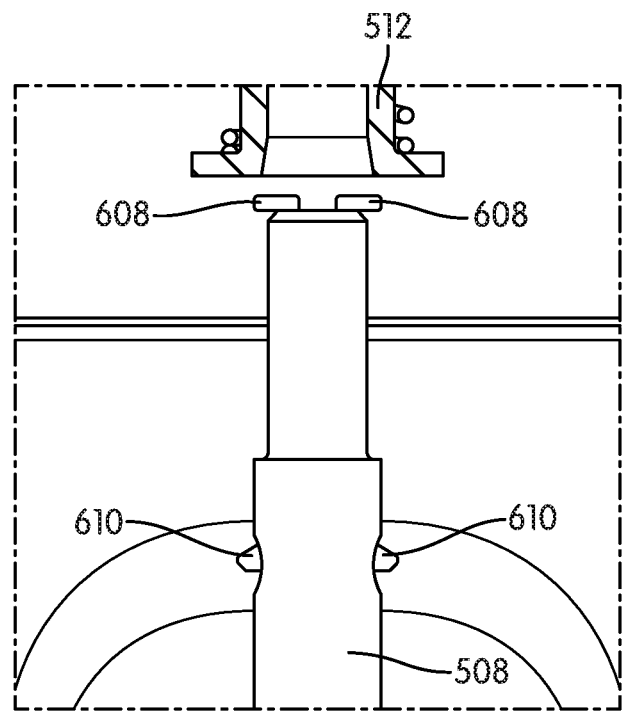
FIGS. 6A and 6B show close-up views of the central shaft of the CV system of FIG. 5.
Figure 6B:
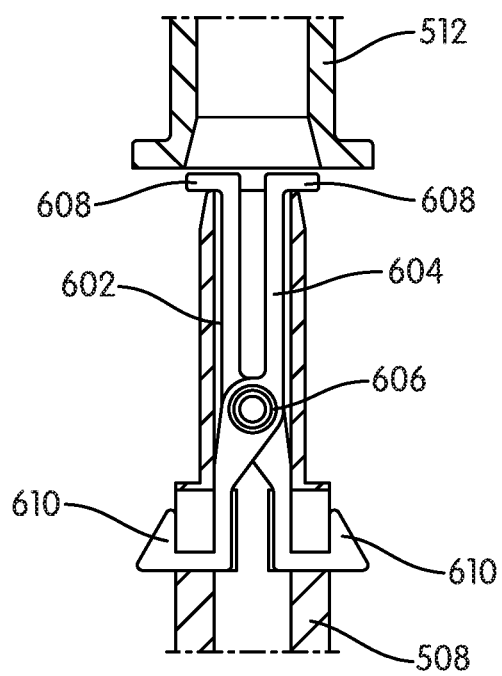

Referring to FIGS. 6A and 6B, close-up views of the central shaft 508 of the CV system 500 are shown. The central shaft 508 includes a spring-loaded scissor device formed by a first scissor arm 602, a second scissor arm 604, and a torsion spring 606. Each of the scissor arms 602 and 604 includes overhang tab 608 and a button portion 610. When the button portions 610 are pressed in towards the central axis 510, each of the overhang tabs 608 retract inwards towards the central axis 510. The torsion spring 606 biases the first scissor arm 602 and the second scissor arm 604 into an uncompressed position (shown in FIGS. 6A and 6B). The uncompressed position occurs when no coalescing element is fitted over the central shaft 508 (i.e., when no coalescing element is installed in the housing). While in the uncompressed position, the overhang tabs 608 and the button portions 610 extend radially outward from the central shaft 508. In the uncompressed position, the bushing 512 cannot be slid over the central shaft 508 because the overhang tabs 608 block the bushing 512. Accordingly, the housing cover 504 cannot be secured to the housing base 502 when no coalescing element (or a non-authorized coalescing element) is installed in the housing of the CV system 500. As described below, when a coalescing element is installed in the CV system 500, the coalescing element displaces the button portions 610 inwards towards the central axis 510, which displaces the overhang tabs 608 inwards towards the central axis 510. The housing cover 504 can be secured to the housing base 502 when a coalescing element is installed in the CV system 500.

Figure 7A:
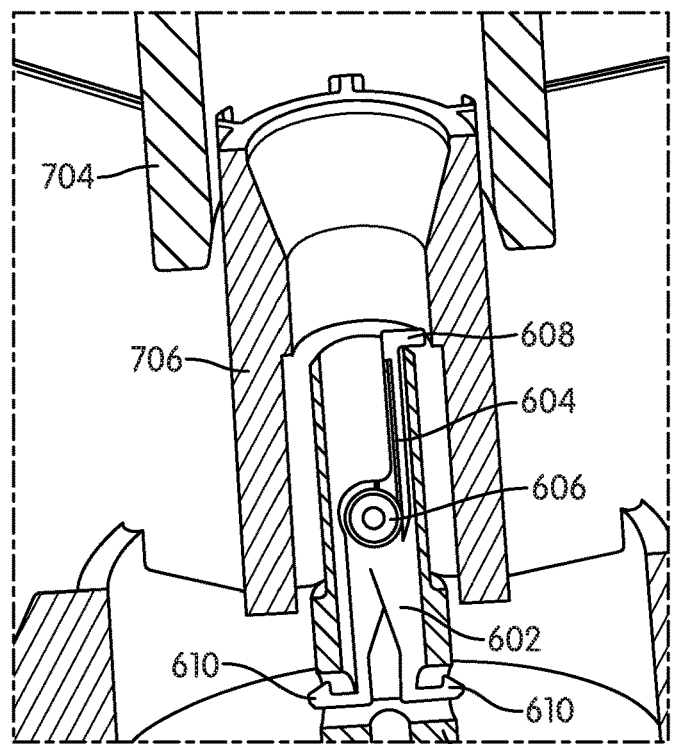
FIGS. 7A through 7G show close-up views of the central shaft of the CV system of FIG. 5 during the coalescing element installation process.

FIGS. 7A through 7G show close-up views of the central shaft 508 of the CV system 500 during the coalescing element installation process. As shown in FIG. 7A, a coalescing element 702 (FIG. 7C) is being inserted into the CV system 500. The coalescing element 702 includes an upper frame member 704 and a lower frame member 706. In some arrangements, the upper frame member 704 is coupled to the lower frame member 706. In other arrangements, the upper frame member 704 and the lower frame member 706 are formed of a single piece. The lower frame member 706 is sized and shaped to fit over the central shaft 508 when the first scissor arm 602 and the second scissor arm 604 are in the uncompressed state. Accordingly, the lower frame member 706 has enough clearance to fit over the overhang tabs 608.

Figure 7B:
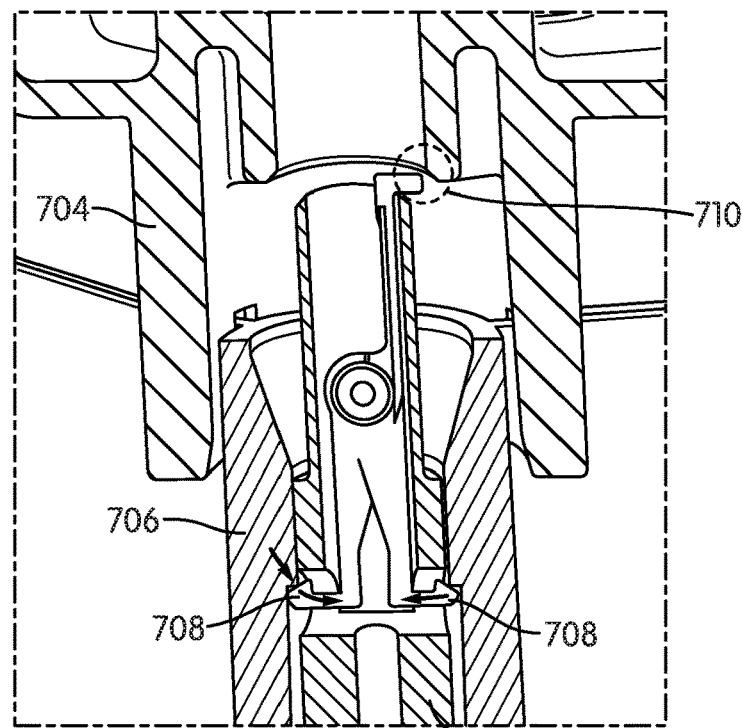

As shown in FIG. 7B, as the coalescing element continues to be inserted, the lower frame member 706 interacts with the button portions 610 of the scissor arms 602 and 604. Specifically, the lower frame member 706 pushes the button portions 610 inwards as indicated by arrows 708. In doing so, the lower frame member 706 causes the overhang tabs 608 to retract. The retraction of the overhang tabs 608 creates clearance 710 between the overhang tabs 608 and the upper frame member 704. Accordingly, the upper frame member 704 can pass the overhang tabs 608 thereby allowing the coalescing element 702 to be installed over the central shaft 508.

Figure 7C:
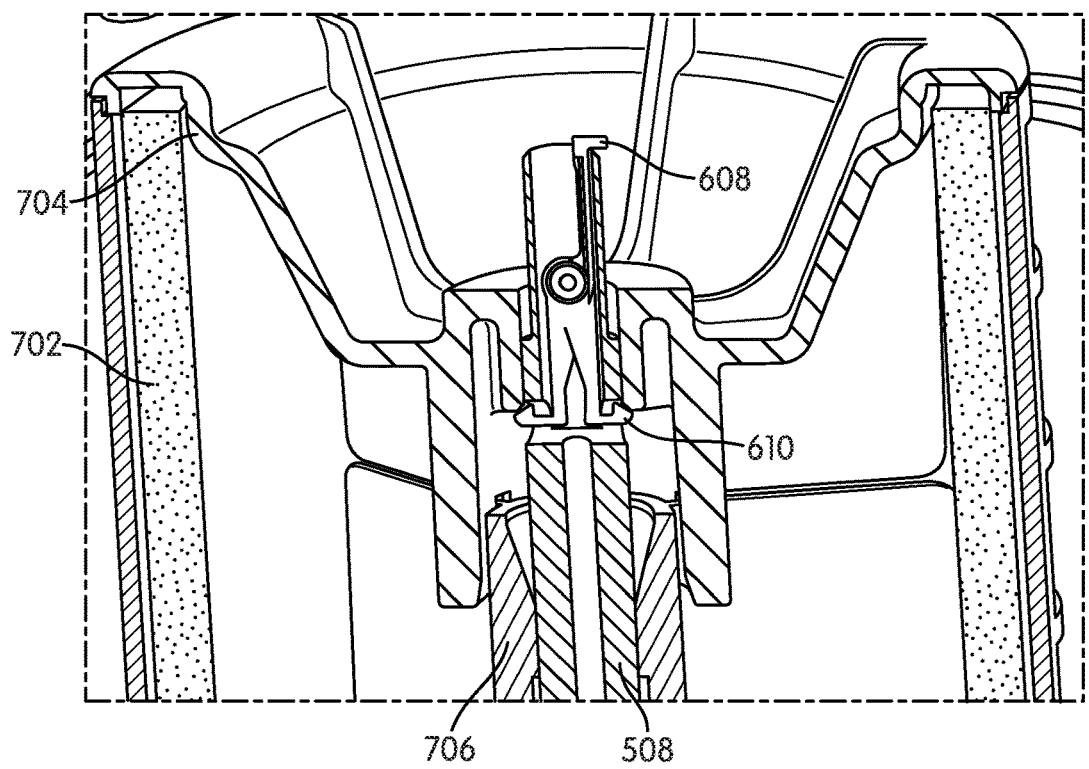
Figure 7D:
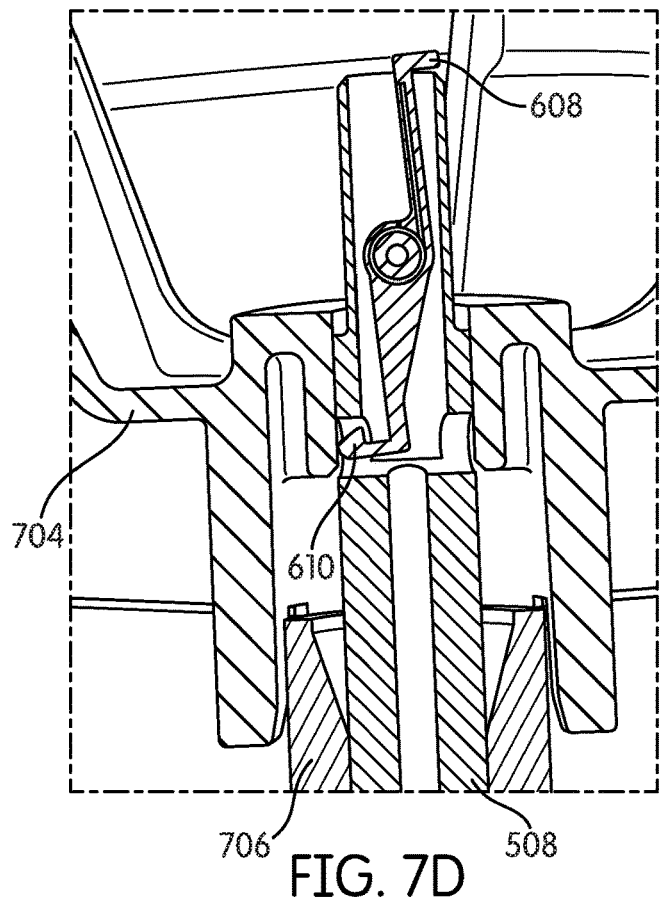
Figure 7E:
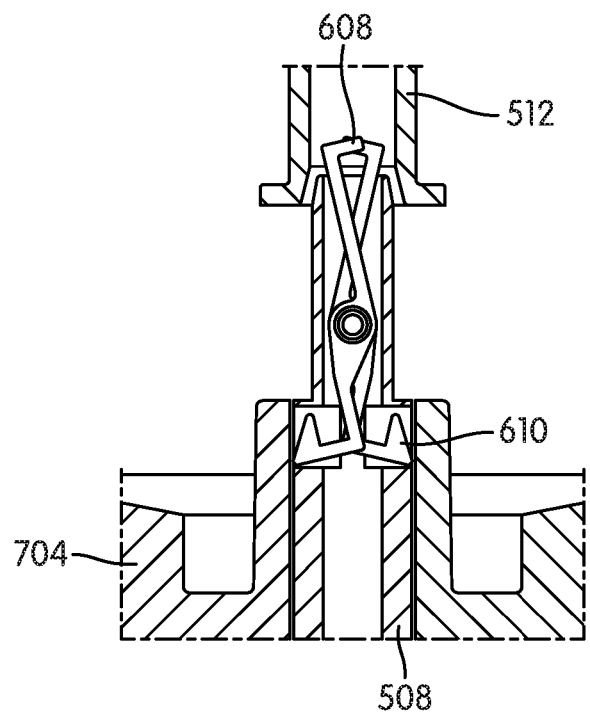
Figure 7F:
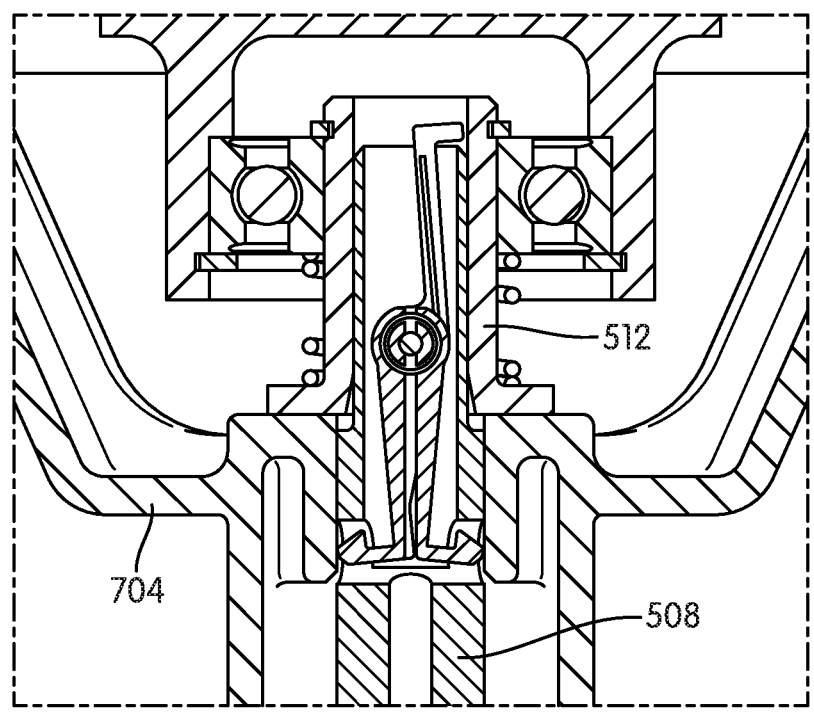
Figure 7G:
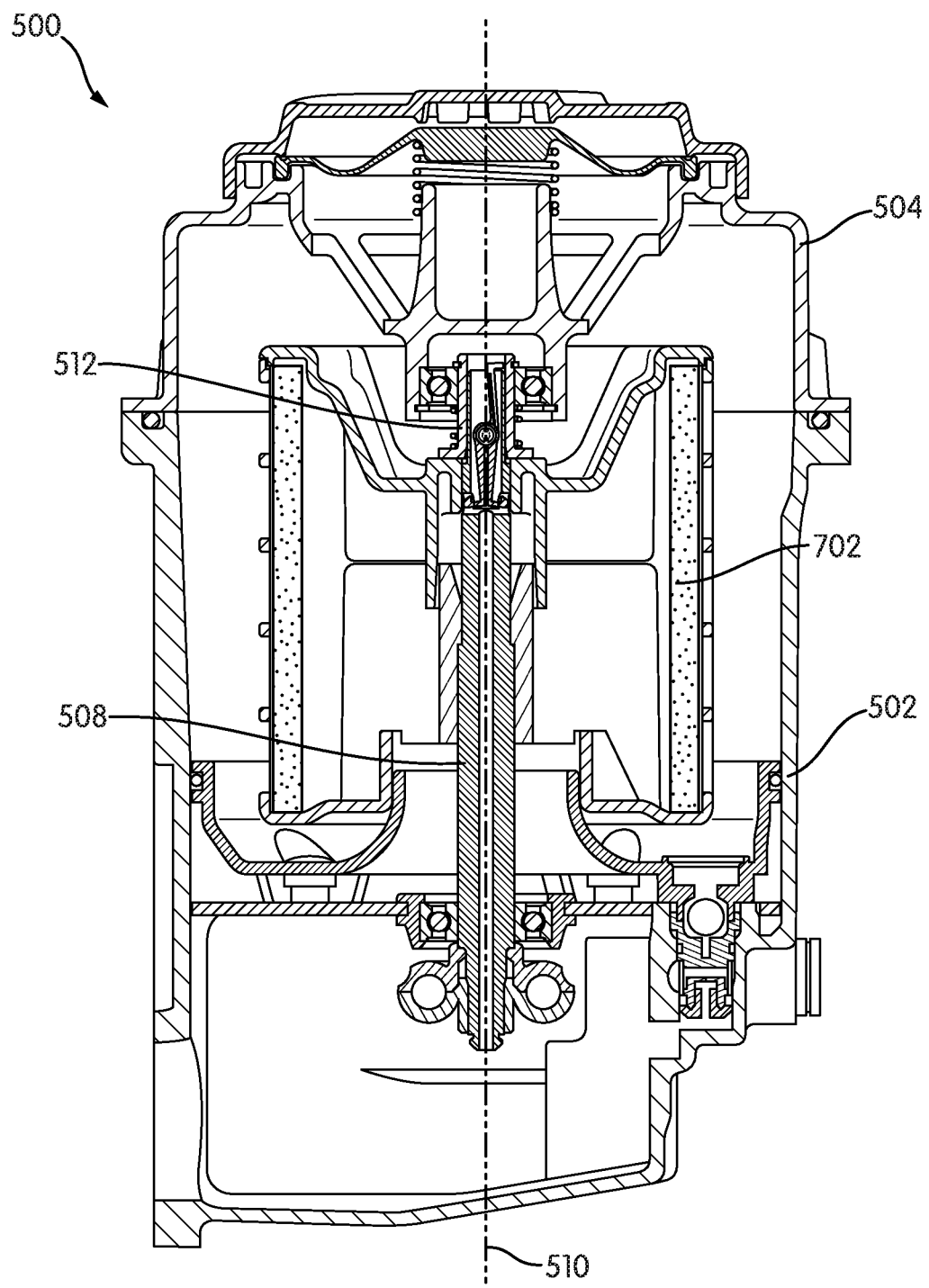

As shown in FIG. 7C, as the coalescing element 702 continues to be inserted, the upper frame member 704 clears the overhang tabs. Additionally, the button portions 610 are no longer pressed, and the scissor arms 602 and 604 return to the uncompressed state. Continuing on to FIG. 7D, the upper frame member 704 interacts with the button portions 610 to retract the overhang tabs 608. As shown in FIG. 7D, the coalescing element 702 is fully installed over the central shaft 508. Once the coalescing element 702 is assembled on the central shaft 508, the button portions 610 are pressed together, which maintains the overhang tabs 608 in a retracted position. Accordingly, as shown in FIGS. 7E-7G, there is enough clearance to fit the bushing 512 of the housing cover over the central shaft 508. Continuing to FIG. 7E, the housing cover 504 is slid into place. The bushing 512 of the housing cover 504 can now clear the overhang tabs 608 because the upper frame member 704 maintains the scissor arms 602 and 604 in the compressed state. As shown in FIGS. 7F and 7G, when the coalescing element 702 is fully installed in the CV system 500, the housing cover 504 can be fully installed and coupled to the housing base 502. The length of the scissor arms 602 and 604 is selected such that the overhang tabs 608 do not contact a static portion of the housing cover 504 when the housing cover 504 is secured to the housing base 502.

Figure 8:
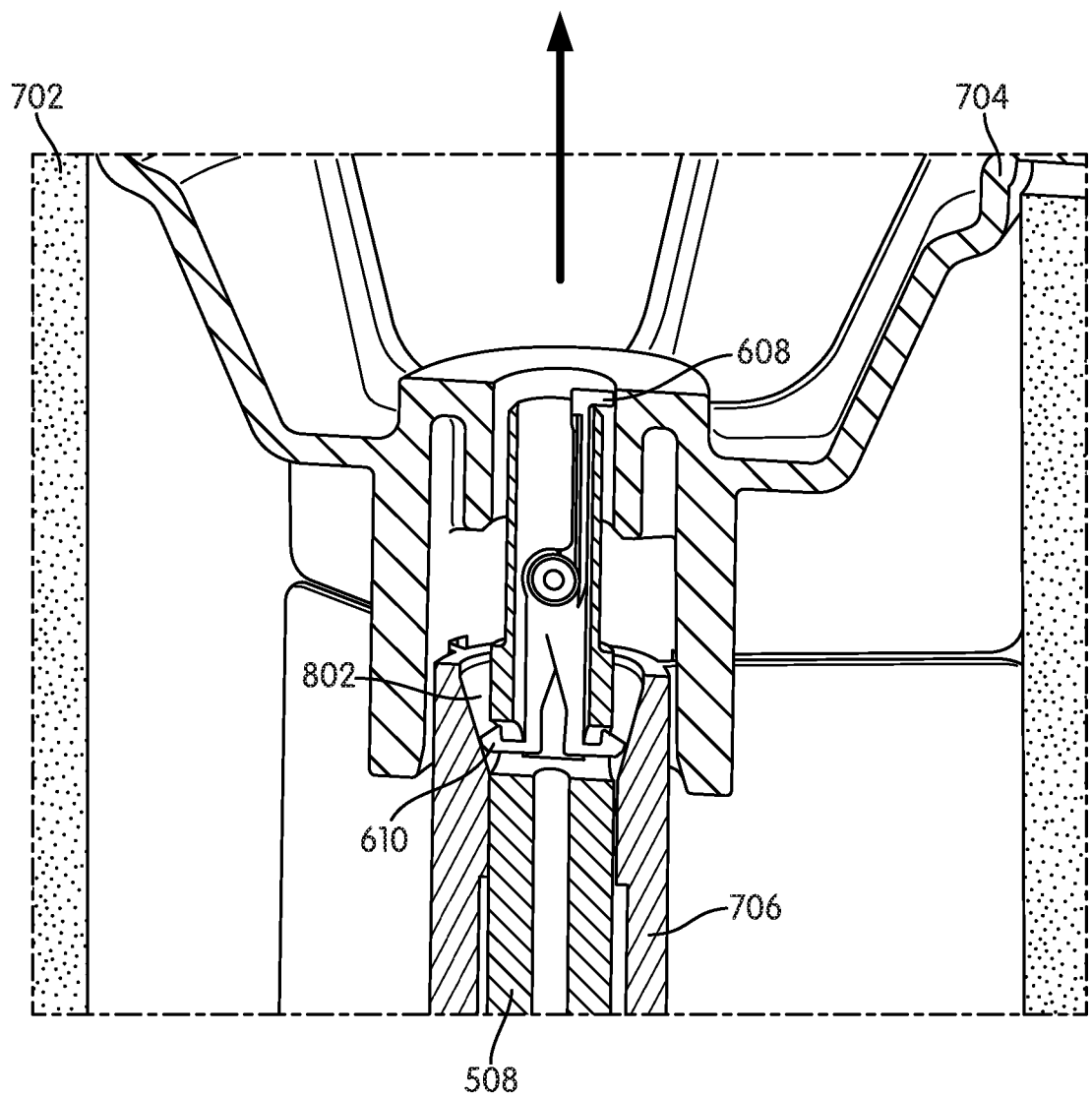
FIG. 8 shows a close-up cross-sectional view of the central shaft of the CV system of FIG. 5 during removal of the coalescing element.

Referring to FIG. 8, a close-up cross-sectional view of the central shaft 508 of the CV system 500 is shown during removal of the coalescing element 702. The lower frame member 706 of the coalescing element 702 includes a ramp portion 802. The ramp portion 802 interacts with the button portions 610 to depress the overhang tabs 608 during removal of the coalescing element 702. As the overhang tabs 608 retract, the coalescing element 702 can be removed from the central shaft 508.

Figure 9:
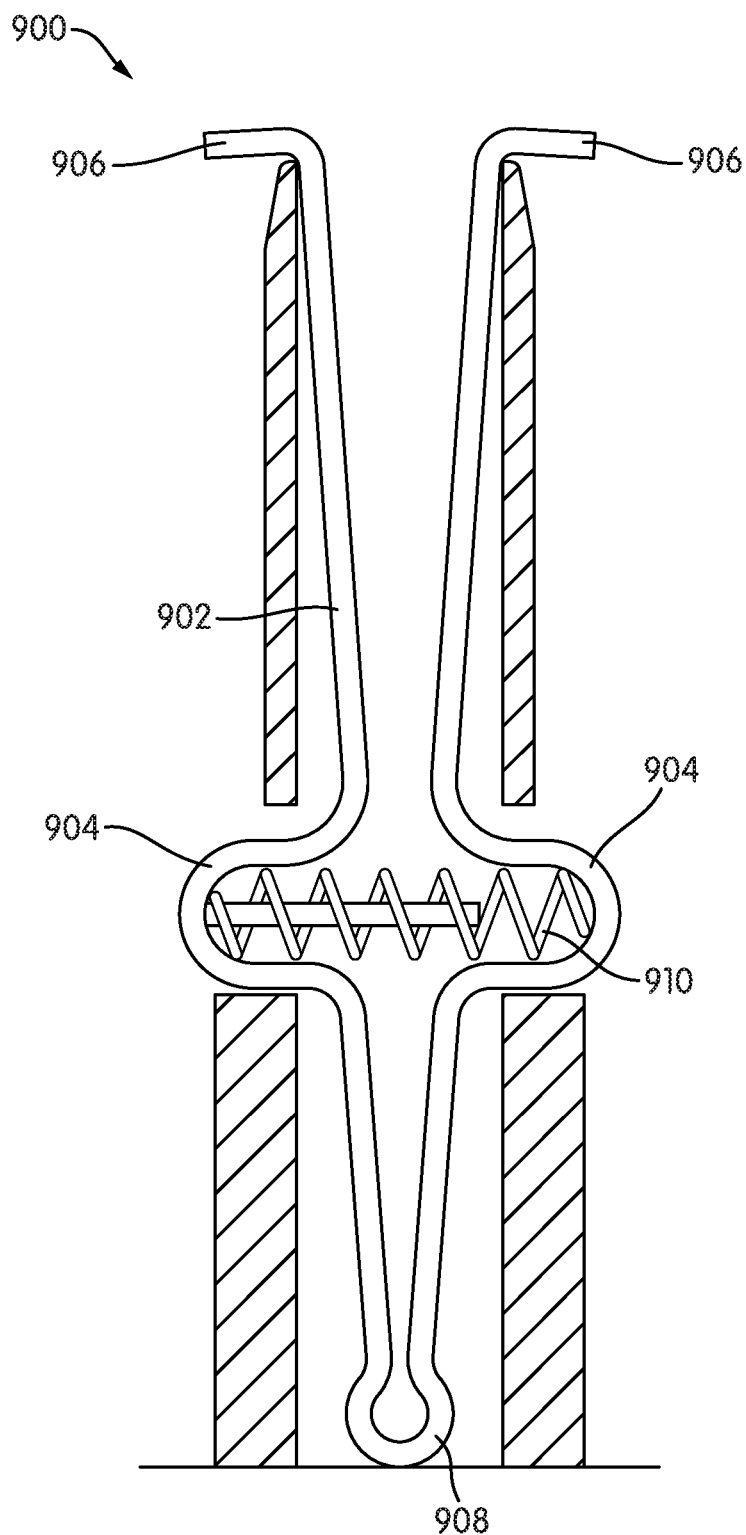
FIG. 9 shows a cross-sectional view of a no-filter no-assembly feature according to an example embodiment.

Referring to FIG. 9, a cross-sectional view of a no-filter no-assembly feature 900 is shown according to an example embodiment. The no-filter no-assembly feature 900 replaces the first scissor arm 602, the second scissor arm 604, and the torsion spring 606 of the central shaft 508 of the CV system 500. The no-filter no-assembly feature 900 includes a main body 902. In some arrangements, the main body 902 is comprised of stamped spring steel. In other arrangements, the main body 902 is comprised of molded plastic. The main body 902 includes button portions 904 extending through the central shaft 508. The main body 902 includes overhang tabs 906 extending axially from the central axis 510 of the central shaft 508. A joint 908 couples the two opposing sides of the main body 902. The joint 908 may be a hinge, e.g., a living hinge. In arrangements where the main body 902 is comprised of stamped spring steel, the joint 908 also provides a biasing force to bias the main body 902 into the position shown in FIG. 9. In some arrangements, a coil spring 910 may be provided between the opposing button portions 904 to bias the two opposing sides of the main body 902. The button portions 904 and the overhang tabs 906 work in the same manner as described above with respect to the button portions 610 and the overhang tabs 608 of the scissor arms 602 and 604.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A crankcase ventilation system, comprising:
a housing having a housing base and a housing cover, the housing cover removably attachable to the housing base, the housing is configured to receive a coalescing element;
a central shaft; and
a spring-loaded no-filter no-assembly feature that prevents the housing cover from being secured to the housing base when the coalescing element is not installed within the housing, the spring-loaded no-filter no-assembly feature positioned within the central shaft;
wherein the spring-loaded no-filter no-assembly feature comprises a first scissor arm, a second scissor arm, and a torsion spring, the torsion spring biasing the first scissor arm and the second scissor arm into an uncompressed state.

2. The crankcase ventilation system of claim 1, wherein the first scissor arm, the second scissor arm, and the torsion spring are positioned within the central shaft.

3. The crankcase ventilation system of claim 2, wherein each of the first scissor arm and the second scissor arm includes an overhang tab and a button portion, wherein when the button portions of the first scissor arm and the second scissor arm are pressed in towards a center axis of the central shaft, the overhang tabs retract inwards towards the center axis.

4. The crankcase ventilation system of claim 3, wherein in the uncompressed state, the overhang tabs are extended outwards from the central axis thereby preventing the housing cover from being secured to the housing base.

5. The crankcase ventilation system of claim 3, wherein the coalescing element is structured to press the button portions of the first scissor arm and the second scissor arm when the coalescing element is installed over the central shaft, thereby retracting the overhang tabs so to allow the housing cover to be secured to the housing base.

* * * * *